United States Patent
Colistro et al.

(10) Patent No.: US 11,207,936 B2
(45) Date of Patent: Dec. 28, 2021

(54) LEVELING MOWER HITCH

(71) Applicant: Schulte Industries Ltd., Saskatoon (CA)

(72) Inventors: Vincent Colistro, Saskatoon (CA); Todd Hofmann, Saskatoon (CA)

(73) Assignee: Schulte Industries Ltd., Englefeld (CA)

( * ) Notice: Subject to any disclaimer, the term of this patent is extended or adjusted under 35 U.S.C. 154(b) by 207 days.

(21) Appl. No.: 16/713,067

(22) Filed: Dec. 13, 2019

(65) Prior Publication Data
US 2021/0094378 A1 Apr. 1, 2021

(30) Foreign Application Priority Data
Sep. 27, 2019 (CA) ........................ 3057023

(51) Int. Cl.
*B62D 49/08* (2006.01)
*B60G 17/04* (2006.01)
*B60D 1/24* (2006.01)
*A01D 34/64* (2006.01)
*A01D 34/74* (2006.01)
*A01D 69/03* (2006.01)
*A01D 101/00* (2006.01)

(52) U.S. Cl.
CPC ............ *B60G 17/04* (2013.01); *A01D 34/64* (2013.01); *A01D 34/74* (2013.01); *A01D 69/03* (2013.01); *B60D 1/24* (2013.01); *A01D 2101/00* (2013.01); *B60G 2202/152* (2013.01); *B60G 2300/08* (2013.01); *B60G 2500/30* (2013.01)

(58) Field of Classification Search
CPC ............ B60G 17/04; B60G 2202/152; B60G 2300/08; B60G 2500/30; A01D 34/64; A01D 34/74; A01D 69/03; A01D 2101/00; B60D 1/24
USPC ........................................ 280/6.154
See application file for complete search history.

(56) References Cited

U.S. PATENT DOCUMENTS

| | | | | | |
|---|---|---|---|---|---|
| 3,912,017 | A | * | 10/1975 | Rehn ...................... | A01B 63/22 172/328 |
| 4,373,591 | A | * | 2/1983 | Schaaf .................. | A01B 59/04 172/328 |
| 4,606,413 | A | * | 8/1986 | Hake ...................... | A01B 63/22 172/328 |
| 5,992,535 | A | * | 11/1999 | Bierl .................... | A01B 63/166 172/328 |

(Continued)

*Primary Examiner* — Toan C To
(74) *Attorney, Agent, or Firm* — Dickinson Wright PLLC; Andrew D. Dorisio (57) ABSTRACT

An implement includes a hydraulic control to move rear wheels upward and downward. A hitch frame has a rear end pivotally connected to a front of the implement's frame about an upper hitch pivot axis and a front end connectable to a tractor drawbar. A tension link has a rear end pivotally connected to the front end of the implement about a lower hitch pivot axis located below and parallel to the upper hitch pivot, and a front end movably mounted to a front of the hitch frame. A front hydraulic cylinder moves the front end of the tension link forward and rearward. The hydraulic control activates the front hydraulic cylinder to move the tension link rearward as the rear hydraulic cylinder moves the rear wheels upward with respect to the implement frame, and to move the front end of the tension link forward as the rear wheels move downward.

17 Claims, 5 Drawing Sheets

(56) References Cited

U.S. PATENT DOCUMENTS

| | | | | |
|---|---|---|---|---|
| 6,068,064 | A * | 5/2000 | Betti | A01B 63/32 |
| | | | | 172/413 |
| 6,397,953 | B1 * | 6/2002 | Ankenman | A01B 51/04 |
| | | | | 172/445.1 |
| 6,679,339 | B1 * | 1/2004 | Steinlage | A01B 63/22 |
| | | | | 172/395 |
| 6,877,758 | B2 | 4/2005 | Colistro | |
| 8,006,775 | B2 * | 8/2011 | Steinlage | A01C 7/006 |
| | | | | 172/151 |
| 8,336,639 | B2 * | 12/2012 | Palen | A01B 63/22 |
| | | | | 172/328 |
| 9,370,137 | B2 * | 6/2016 | Hennes | A01B 23/046 |
| 9,504,202 | B2 | 11/2016 | Neudorf et al. | |
| 9,648,799 | B2 * | 5/2017 | Ohnsat | A01B 21/08 |
| 10,736,255 | B2 | 8/2020 | Czapka et al. | |
| 2013/0068489 | A1 * | 3/2013 | Blunier | A01B 63/22 |
| | | | | 172/239 |

* cited by examiner

LEVELING MOWER HITCH

BACKGROUND

Towed implements, for example mowing implements, are well known where the front end of the mower is connected to a tractor hitch and the weight of the front portion of the mower is supported on the tractor hitch, with the rear end of the mower supported on rear wheels that are movable up and down. Such a mowing implement is moved up and down by moving the rear wheels up and down, however for proper operation the mowing implement must be kept level from the front end to the rear end.

Since the tractor hitch is at a fixed height above the ground, the front hitch assembly of the mower extends rearward from the tractor end to a mower end that is pivotally attached to the mower. The rear wheels are linked to the front hitch assembly by levelling rods extending over the mower deck and arranged to pivot the front hitch assembly with respect to the front end of the mower as the rear wheels move up and down in order to maintain a constant front to rear angle of the mower deck with respect to the ground surface as the rear wheels move the mower deck up and down. This is desired to maintain consistent mowing height for the mower.

SUMMARY OF THE INVENTION

The present disclosure provides an implement apparatus that overcomes problems in the prior art.

In a first embodiment the present disclosure provides an implement apparatus comprising an implement frame with a plurality of rear wheels pivotally mounted to a rear end of the implement frame and operative to support the rear end of the implement frame for travel along a ground surface in an operating travel direction. A hydraulic control is operative to direct hydraulic fluid to a rear hydraulic cylinder to selectively move the rear wheels upward and downward with respect to the implement frame. A hitch assembly comprises a hitch frame, wherein a rear end of the hitch frame is pivotally connected to a front end of the implement frame about an upper hitch pivot axis oriented substantially horizontally and perpendicular to the operating travel direction, and a front end of the hitch frame is adapted for releasable connection to a tractor drawbar. A tension link has a rear end pivotally connected to the front end of the implement frame about a lower hitch pivot axis located below the upper hitch pivot axis and oriented substantially parallel to the upper pivot axis, and a front end of the tension link is movably mounted to a front portion of the hitch frame. A front hydraulic cylinder is operative to move the front end of the tension link forward and rearward. The hydraulic control is selectively operative to activate the front hydraulic cylinder to move the front end of the tension link rearward as the rear hydraulic cylinder moves the rear wheels upward with respect to the implement frame, and the hydraulic control is operative to activate the front hydraulic cylinder to move the front end of the tension link forward as the rear hydraulic cylinder moves the rear wheels downward with respect to the implement frame such that a front to rear angle of the implement frame with respect to the ground surface is substantially constant as the rear wheels move up and down with respect to the implement frame.

In a second embodiment the present disclosure provides a method of maintaining a substantially consistent front to rear angle of an implement frame with respect to a ground surface, where the implement frame is mounted on a plurality of rear wheels pivotally mounted to a rear end of the implement frame to support the rear end of the implement frame for travel along the ground surface in an operating travel direction, and where a rear hydraulic cylinder is activated to selectively move the rear wheels upward and downward with respect to the implement frame. The method comprises pivotally connecting a rear end of a hitch frame to a front end of the implement frame about an upper hitch pivot axis oriented substantially horizontally and perpendicular to the operating travel direction; configuring a front end of the hitch frame for releasable connection to a tractor drawbar; pivotally connecting a rear end of a tension link to the front end of the implement frame about a lower hitch pivot axis located below the upper hitch pivot axis and oriented substantially parallel to the upper pivot axis, and movably mounting a front end of the tension link to a front portion of the hitch frame; connecting a front hydraulic cylinder to the hitch frame such that the front hydraulic cylinder is operative to move the front end of the tension link forward and rearward; providing a hydraulic control operative to control a flow of hydraulic fluid to the front and rear hydraulic cylinders; operating the hydraulic control to activate the front hydraulic cylinder to move the front end of the tension link rearward as the rear hydraulic cylinder moves the rear wheels upward with respect to the implement frame, and operating the hydraulic control to activate the front hydraulic cylinder to move the front end of the tension link forward as the rear hydraulic cylinder moves the rear wheels downward with respect to the implement frame such that the front to rear angle of the implement frame with respect to the ground surface is substantially constant as the rear wheels move up and down with respect to the implement frame.

The hitch assembly of the present disclosure provides a system that maintains a consistent height of cut or ground penetration of working tools attached to an implement frame that is supported at a fixed height on a tractor drawbar at the front end, and that is supported on rear wheels that move up and down to adjust a height of the frame and tools. Where the implement frame is a mower deck, the need for levelling rods such as used in conventional rotary mowers which gather debris and interfere with cleaning of the top of the mower deck is avoided.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
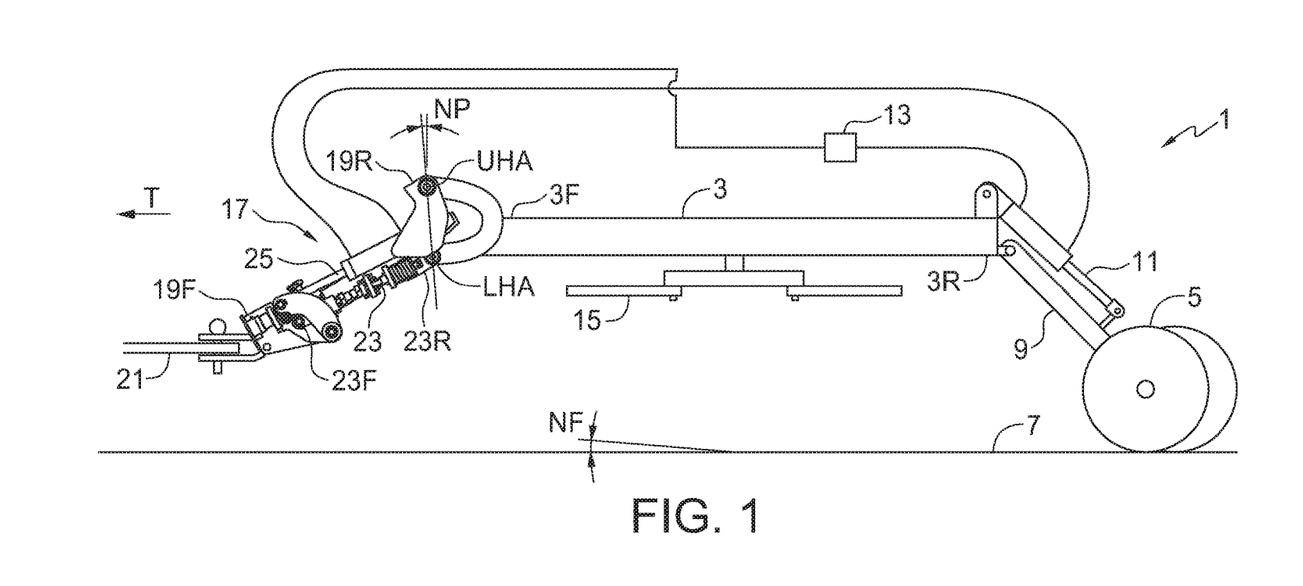
FIG. 1 is a schematic side view of an embodiment of the implement apparatus of the present disclosure with the implement frame in a raised position.
Figure 2:
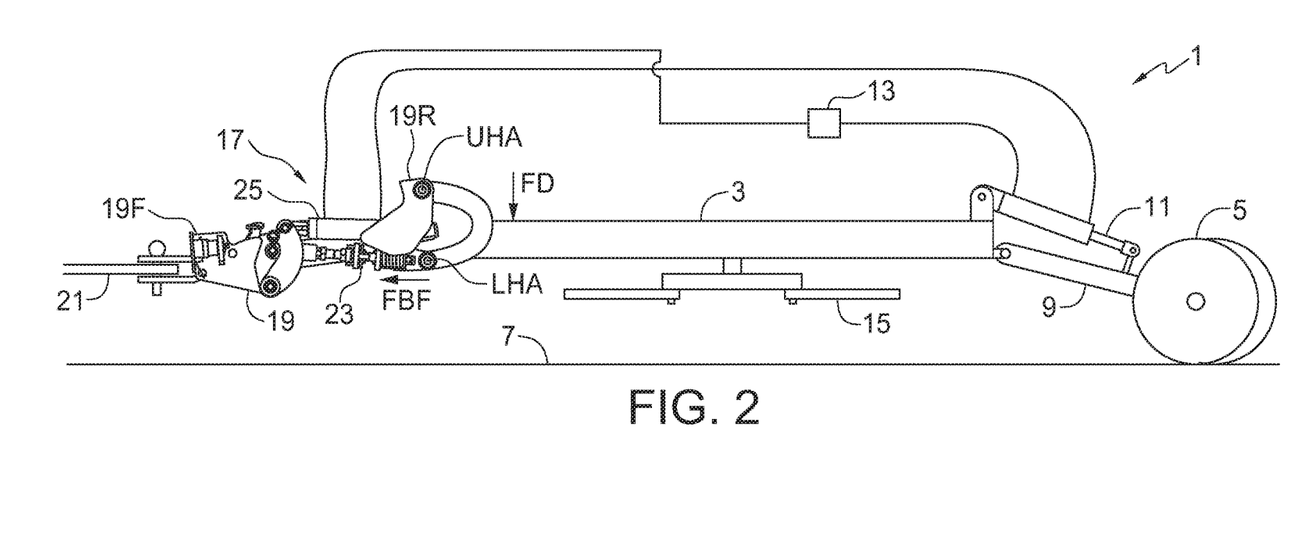
FIG. 2 is a schematic side view of the embodiment of FIG. 1 with the implement frame in a lowered position.
Figure 3:
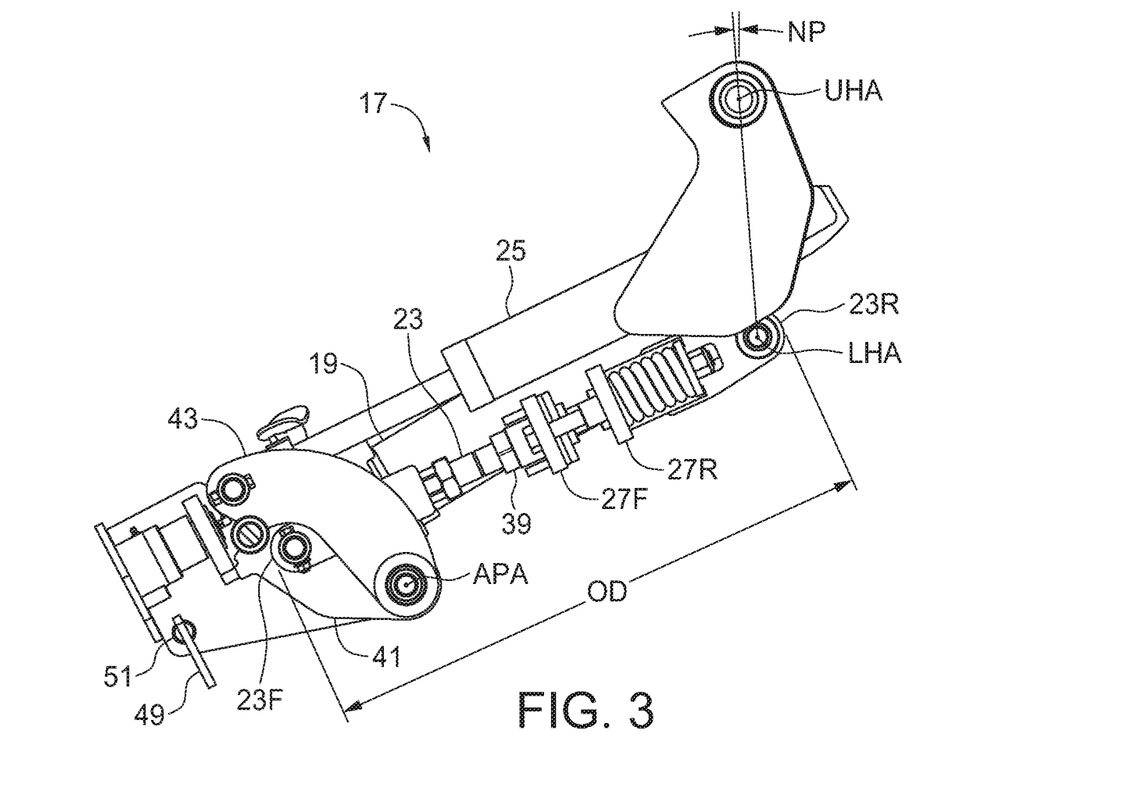
FIG. 3 is a side view of the hitch assembly of the embodiment of FIG. 1 with the implement frame in the raised position of FIG. 1.
Figure 4:
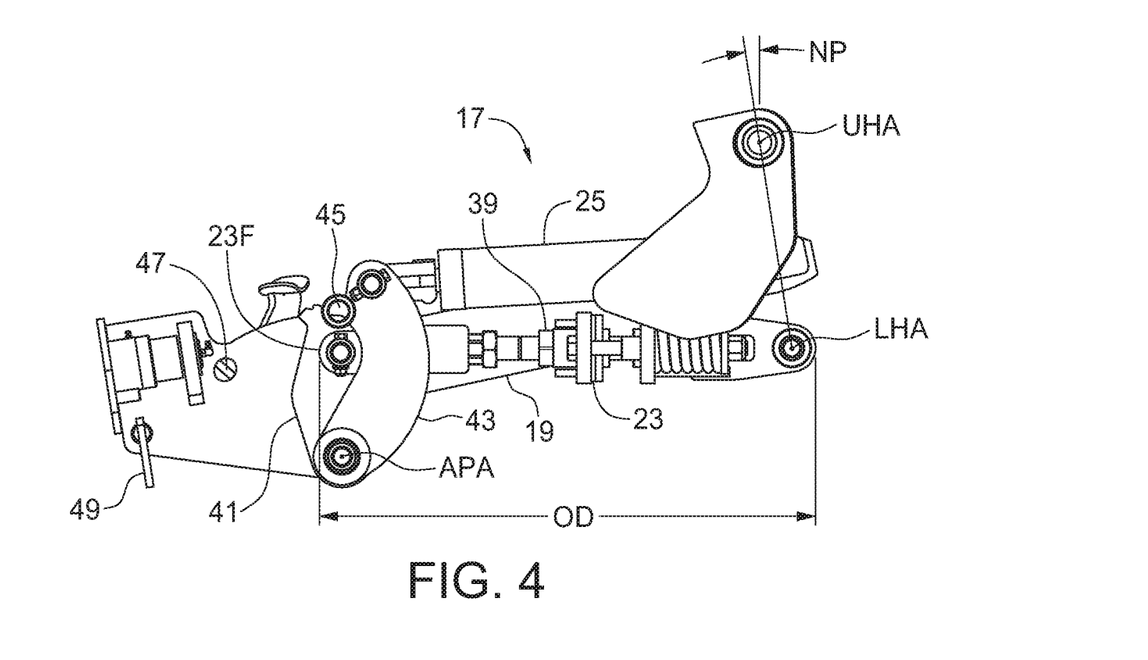
FIG. 4 is a side view of the hitch assembly of the embodiment of FIG. 1 with the implement frame in the lowered position of FIG. 2.
Figure 5:
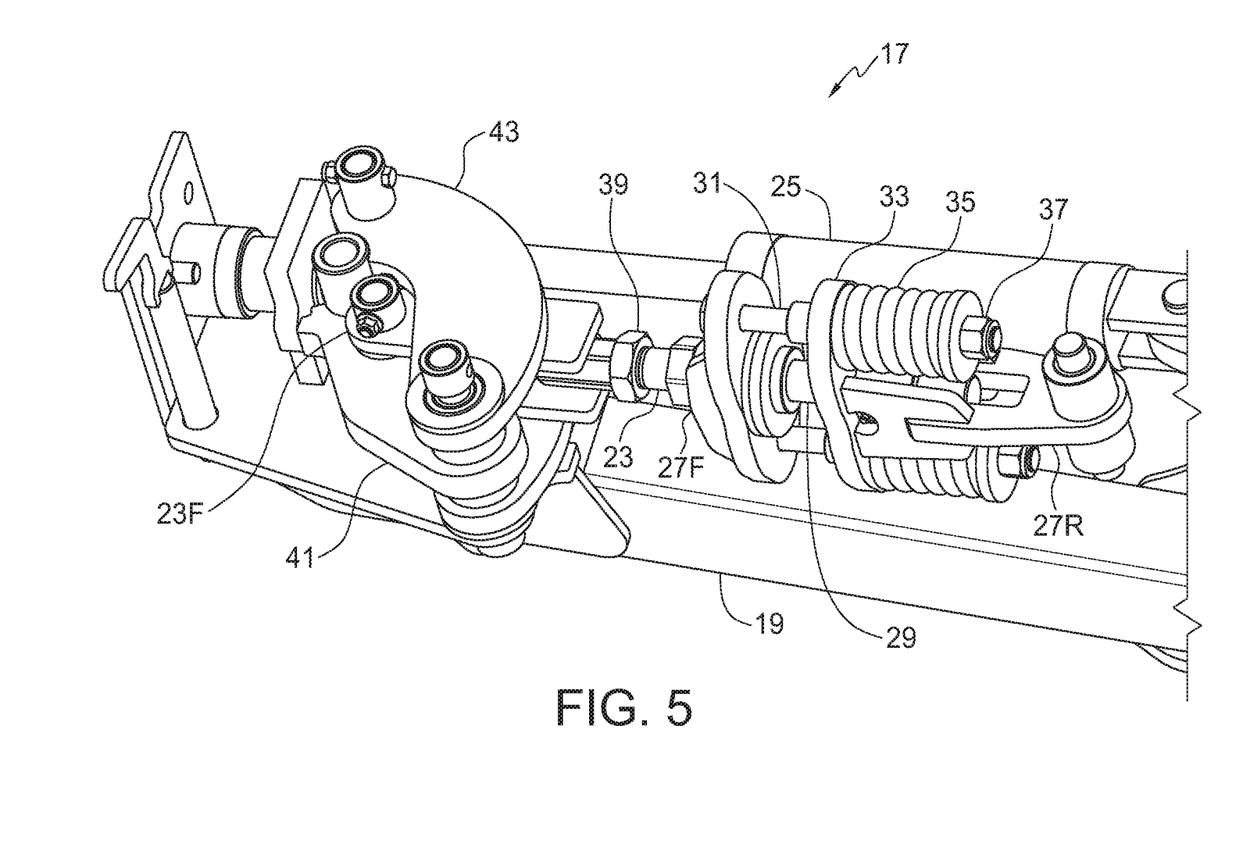
FIG. 5 is a bottom perspective view of the hitch assembly of the embodiment of FIG. 1 shown in an intermediate position.

FIGS. 1 and 2 schematically illustrate an embodiment of an implement apparatus 1 of the present disclosure comprising a implement frame 3, and a plurality of rear wheels 5 spaced laterally across the width of the implement frame 3 to support the rear end 3R of the implement frame 3 for travel along a ground surface 7 in an operating travel direction T. The rear wheels 5 are pivotally mounted to a rear end 3R of the implement frame 3 by one or more wheel supports 9 and a rear hydraulic cylinder 11 is connected to the rear end 3R of the implement frame 3 and to the wheel support 9 with a hydraulic control 13 operative to direct hydraulic fluid to the rear hydraulic cylinder 11 to selectively move the rear wheels 5 upward and downward with respect to the implement frame 3. The implement frame 3 can for example be a mowing implement frame with rotary blades 15 mounted under the implement frame 3, and it is contemplated that ground engaging tools or the like could also be mounted on the implement frame 3.

Figure 6:
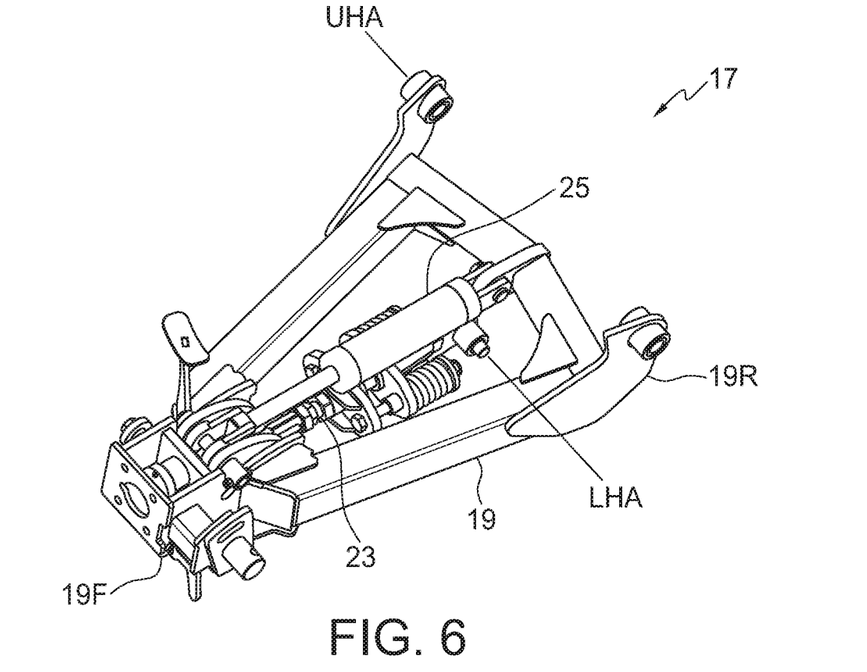
FIG. 6 is a perspective top view of the hitch assembly of the embodiment of FIG. 1 with the implement frame in the raised position of FIG. 1.
Figure 7:
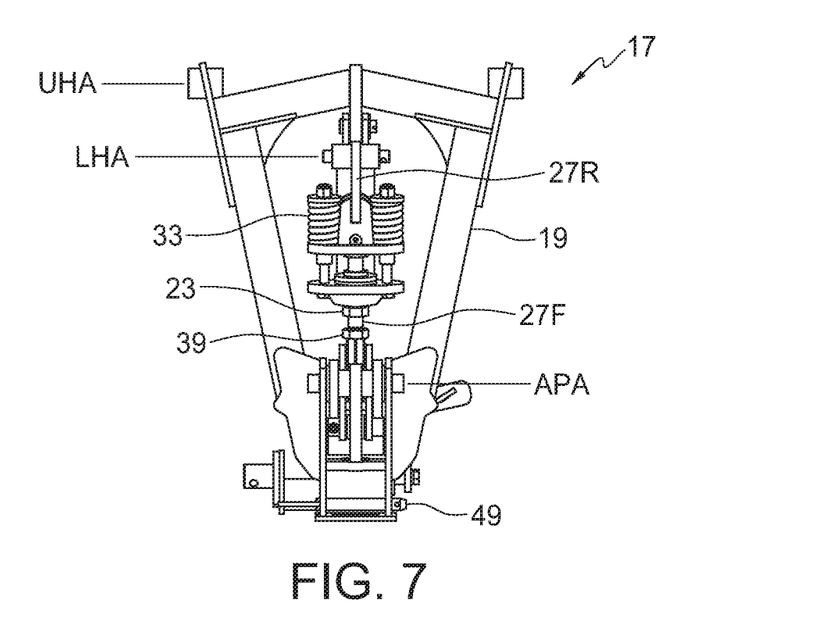
FIG. 7 a bottom view of the hitch assembly of the embodiment of FIG. 1 with the implement frame in the raised position of FIG. 1

A hitch assembly 17 is mounted to the front end of the implement frame 3 and is illustrated in further detail in FIGS. 3-7. The hitch assembly 17 comprises a hitch frame 19, wherein a rear end 19R of the hitch frame 19 is pivotally connected to a front end 3F of the implement frame 3 about an upper hitch pivot axis UHA oriented substantially horizontally and perpendicular to the operating travel direction T of the implement frame 3. The front end 19F of the hitch frame 19 is adapted for releasable connection to a tractor drawbar 21. In FIGS. 1-5, a side portion of the hitch frame 19 facing the viewer has been removed to allow illustration of the arrangement of the parts of the hitch assembly 17. The full hitch frame 19 is shown in FIGS. 6 and 7.

The tractor drawbar 21 is located at a fixed drawbar height DBH above the ground surface 7 and the hitch assembly 17 is configured to maintain a substantially constant front to rear angle NF of the implement frame 3 with respect to the ground surface 7 as the rear wheels 5 move the implement frame 3 up and down. This is desired to maintain consistent mowing height for a mower, or consistent ground penetration for ground engaging tools, as is generally desired.

FIGS. 1 and 2 illustrate the implement frame 3 oriented horizontally with respect to the ground surface 7, and so the angle NF is zero degrees, however other angles may be desired, and the hitch assembly 17 can be configured to achieve various angles as described below.

A tension link 23 has a rear end 23R pivotally connected to the front end 3F of the implement frame 3 about a lower hitch pivot axis LHA located below the upper hitch pivot axis UHA and oriented substantially parallel to the upper pivot axis UHA. The front end 23F of the tension link 23 is movably mounted to a front portion of the hitch frame 19, and a front hydraulic cylinder 25 is operative to move the front end 23F of the tension link 23 forward and rearward.

The hydraulic control 13 is operative to activate the front hydraulic cylinder 25 to selectively move the front end 23F of the tension link 23 rearward as the rear hydraulic cylinder 11 moves the rear wheels 5 upward with respect to the implement frame 3, and the hydraulic control 13 is operative to activate the front hydraulic cylinder 25 to move the front end 23F of the tension link 23 forward as the rear hydraulic cylinder 11 moves the rear wheels 5 downward with respect to the implement frame 3 such that the front to rear angle NF of the implement frame 3 with respect to the ground surface 7 is substantially constant as the rear wheels 5 move up and down with respect to the implement frame 3.

A pitch angle NP of a line connecting the upper hitch pivot axis UHA and the lower hitch pivot axis LHA with respect to a vertical line remains substantially constant as the rear wheels 5 move up and down and the implement frame 3 move correspondingly down and up.

In the illustrated hitch assembly 17 the front hydraulic cylinder 25 is fluidly connected to the rear hydraulic cylinder 11 such that as hydraulic fluid is directed from the hydraulic control 13 into port 11A of the rear hydraulic cylinder 11 to extend the rear hydraulic cylinder 11 and move the rear wheels 5 downward, hydraulic fluid from port 11B on the rear hydraulic cylinder 11 flows into port 25A on the front hydraulic cylinder to extend the front hydraulic cylinder 25 and move the front end 23A of the tension link 23 forward, and then out of port 25B on the front hydraulic cylinder 25 and back to the hydraulic control 13. The front and rear hydraulic cylinders 11, 25 have dimensions selected as is known in the art so that the front and rear hydraulic cylinders 11, 25 are slaved.

In the same fashion as the rear hydraulic cylinder 11 moves the rear wheels 5 upward with respect to the implement frame 3, hydraulic fluid flows into the front hydraulic cylinder 25 to move the front end 23F of the tension link 23 rearward and thus lower the implement frame 3.

The tension link 23 is in tension when the front end 19F of the hitch frame 19 is connected to the tractor drawbar 21 and the rear end 3R of the implement frame 3 is above the ground surface 7 supported on the rear wheels 5. A front section 27F of the tension link 23 is movably connected to a rear section 27R of the tension link 23 such that a distance between the front and rear ends 23F, 23R of the tension link 23 varies. In the illustrated hitch assembly 17 the front and rear sections 27F, 27R of the tension link 23 are telescopically connected, with the front section 27F sliding into the rear section 27R at connection 29, and with connecting bolts 31 sliding into holes in a spring plate 33.

The tension link 23 exerts a forward bias force FBF on the lower hitch pivot axis LHA when the front end 19F of the hitch frame 19 is connected to the tractor drawbar 21 and the rear end 3R of the implement frame 3 is above a ground surface supported on the rear wheels 5 as shown in FIGS. 1 and 2. In the illustrated hitch assembly 17, the forward bias force FBF is provided by the connecting bolts 31 extending through the spring plate 33 and then through bias elements provided by springs 35 to a nut 37. With the illustrated arrangement the springs 35 exert the forward bias force FBF on the connecting bolts drawing the spring plate 33 fixed to the rear section 27R of the tension link 23, and so also the connected lower hitch pivot axis LHA, toward the front section 27F.

The forward bias force FBF is selected to maintain the distance between the front and rear ends 23F, 23R of the tension link 23 at a substantially constant operating distance OD, and also to allow the distance between the front and rear ends 23F, 23R of the tension link 23 to increase when a downward force FD is exerted on the lower hitch pivot axis LHA that exceeds a release force sufficient to compress the springs 33 and increase the distance D. This movement relieves stress on the hitch assembly 17 by allowing the front end 3F of the implement frame 3 to bounce somewhat when travelling over rough terrain, but the forward bias force FBF returns the front end 3F of the implement frame 3 to the desired operating orientation when normal operating conditions return. It is contemplated that other bias elements such as rubber cushions or the like could be used as well.

It may be desired to adjust the front to rear angle NF of the implement frame 3 with respect to the ground surface 7. This can be achieved by varying the operating distance OD between the front and rear ends of the tension link 23 by turning adjustment nut 39 to effectively lengthen or shorten the front section 27F of the tension link 23.

The illustrated hitch assembly 17 comprises a rocker arm 41 pivotally attached to the hitch frame 19 about an arm pivot axis APA oriented substantially parallel to the upper and lower hitch pivot axes UPA, LPA. The front end 23F of the tension link 23 is connected to the rocker arm 41 and the front hydraulic cylinder 25 is operative to move the rocker arm 41 forward and rearward. The front hydraulic cylinder 25 is connected to a float arm 43 that is also pivotally attached to the hitch frame 19 about the arm pivot axis APA.

The float arm 43 is configured to bear against the rocker arm 41 such that extending and retracting the front hydraulic cylinder 25 moves the front end 23F of the pivot arm 23. The weight of the front end 3A of the implement frame 3 exerts a constant rearward force on the tension link 23 pulling the rocker arm 41 rearward such that the rocker arm 41 bears against and exerts a rearward force on the float arm 43.

In order to operate conventionally in a master/slave hydraulic cylinder arrangement it is usually necessary that all hydraulic cylinders are of the same stroke length. The illustrated arrangement of the rocker arm 41 and float arm 43 provides a linkage that allows the stroke of the front and rear hydraulic cylinders 25, 11 to be different and facilitates using hitch frames 19 of different lengths with the same front hydraulic cylinder 25 by making adjustments to the configuration of the rocker arm 41 and/or float arm 43.

Figure 8:
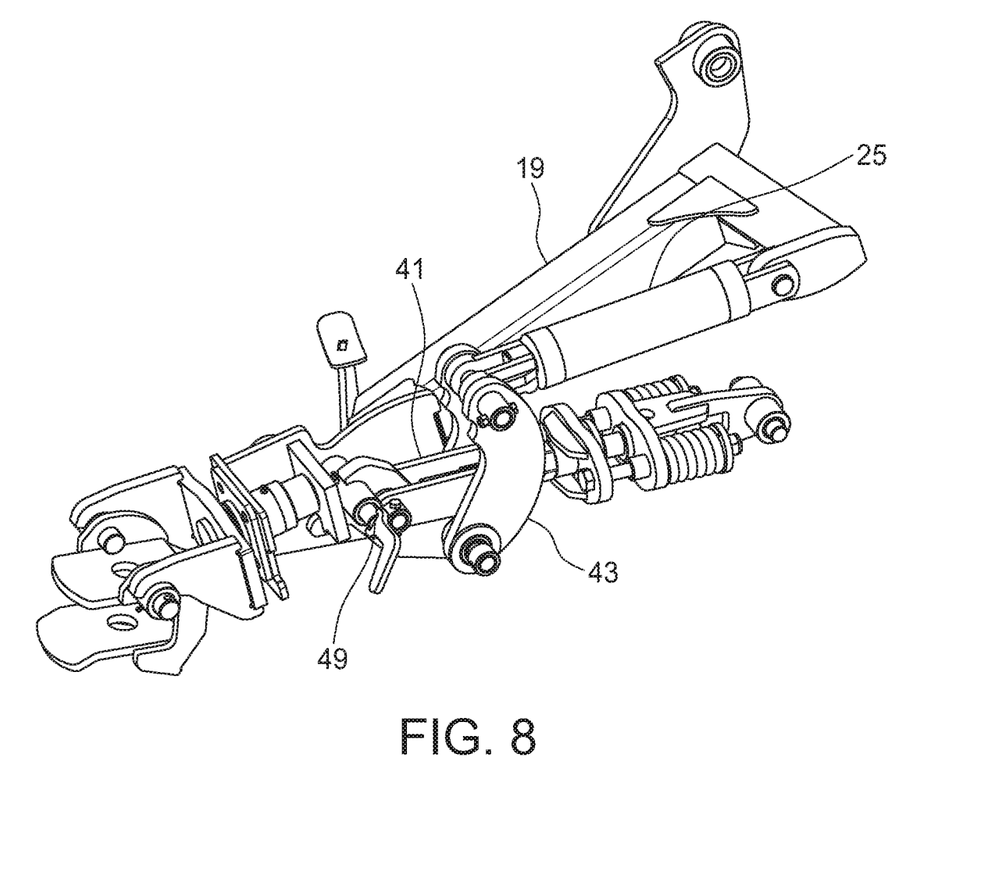
FIG. 8 is a perspective top view of the hitch assembly of the embodiment of FIG. 1 in a locked raised position.

The hitch assembly 17 also includes a transport lock mechanism illustrated in FIG. 8. The rocker arm 43 defines an arm pin hole 45 that is aligned, when in the raised position of FIGS. 1 and 3, with a corresponding frame pin hole 47 in the hitch frame 19. When the arm and frame pin holes 45, 47 are aligned, a lock pin 49 can be removed from its storage holes 51 in the hitch frame 19 and inserted through the aligned arm and frame pin holes 45, 47 as shown in FIG. 8. The lock pin 49 prevents the tension link 23 and lower hitch pivot axis LHA from moving, thus keeping the front end 3F of the implement frame 3 in the raised position if the front hydraulic cylinder 25 fails or is moved to the retracted position shown in FIG. 8.

The present disclosure provides a method of maintaining a substantially consistent front to rear angle NF of an implement frame 3 with respect to the ground surface 7, where the implement frame 3 is mounted on a plurality of rear wheels 5 pivotally mounted to a rear end 3R of the implement frame 3 to support the rear end of the implement frame for travel along the ground surface 7 in an operating travel direction T, and where a rear hydraulic cylinder 11 is activated to selectively move the rear wheels 5 upward and downward with respect to the implement frame 3. The method comprises pivotally connecting a rear end 19R of a hitch frame 19 to a front end 3F of the implement frame 3 about an upper hitch pivot axis UHA oriented substantially horizontally and perpendicular to the operating travel direction T; configuring a front end 19F of the hitch frame 19 for releasable connection to a tractor drawbar 21; pivotally connecting a rear end 23R of a tension link 23 to the front end 3F of the implement frame 3 about a lower hitch pivot axis LHA located below the upper hitch pivot axis UHA and oriented substantially parallel to the upper pivot axis UHA, and movably mounting a front end 23F of the tension link 23 to a front portion of the hitch frame 19; connecting a front hydraulic cylinder 25 to the hitch frame 19 such that the front hydraulic cylinder 25 is operative to move the front end 23F of the tension link 23 forward and rearward; providing a hydraulic control 13 operative to control a flow of hydraulic fluid to the front and rear hydraulic cylinders 25, 11; operating the hydraulic control 13 to activate the front hydraulic cylinder 25 to move the front end 23F of the tension link 23 rearward as the rear hydraulic cylinder 11 moves the rear wheels 5 upward with respect to the implement frame 3, and operating the hydraulic control 13 to activate the front hydraulic cylinder 25 to move the front end 23F of the tension link 23 forward as the rear hydraulic cylinder 11 moves the rear wheels 5 downward with respect to the implement frame 3 such that the front to rear angle NF of the implement frame 3 with respect to the ground surface 7 is substantially constant as the rear wheels 5 move up and down.

The hitch assembly 17 of the present disclosure maintains a constant front to rear angle NF of the implement frame 3 with respect to the ground surface 7 so that the working tools such as mower blades 15 or ground engaging tools attached to the implement frame 3 maintain a consistent height of cut or ground penetration as the rear wheels 5 move the implement frame 3 up and down. The need for levelling rods such as used in conventional rotary mowers which gather debris and interfere with cleaning of the top of the mower deck is avoided.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An implement apparatus comprising:
   an implement frame;
   a plurality of rear wheels pivotally mounted to a rear end of the implement frame and operative to support the rear end of the implement frame for travel along a ground surface in an operating travel direction;
   a rear hydraulic cylinder, and a hydraulic control operative to direct hydraulic fluid to the rear hydraulic cylinder to selectively move the rear wheels upward and downward with respect to the implement frame;
   a hitch assembly comprising:
      a hitch frame, wherein a rear end of the hitch frame is pivotally connected to a front end of the implement frame about an upper hitch pivot axis oriented substantially horizontally and perpendicular to the operating travel direction;
      wherein a front end of the hitch frame is adapted for releasable connection to a tractor drawbar;
      a tension link, wherein a rear end of the tension link is pivotally connected to the front end of the implement frame about a lower hitch pivot axis located below the upper hitch pivot axis and oriented substantially parallel to the upper pivot axis, and wherein a front end of the tension link is movably mounted to a front portion of the hitch frame; and a front hydraulic cylinder operative to move the front end of the tension link forward and rearward;

wherein the hydraulic control is selectively operative to activate the front hydraulic cylinder to move the front end of the tension link rearward as the rear hydraulic cylinder moves the rear wheels upward with respect to the implement frame, and the hydraulic control is operative to activate the front hydraulic cylinder to move the front end of the tension link forward as the rear hydraulic cylinder moves the rear wheels downward with respect to the implement frame such that a front to rear angle of the implement frame with respect to the ground surface is substantially constant as the rear wheels move up and down with respect to the implement frame.

2. The apparatus of claim 1 wherein a pitch angle of a line connecting the upper hitch pivot axis and the lower hitch pivot axis with respect to a vertical line remains substantially constant as the rear wheels move up and down.

3. The apparatus of claim 1 wherein the front hydraulic cylinder is fluidly connected to the rear hydraulic cylinder such that as the rear hydraulic cylinder moves the rear wheels downward with respect to the implement frame, hydraulic fluid flows into the front hydraulic cylinder to move the front end of the tension link forward, and as the rear hydraulic cylinder moves the rear wheels upward with respect to the implement frame, hydraulic fluid flows into the front hydraulic cylinder to move the front end of the tension link rearward.

4. The apparatus of claim 1 wherein the tension link is in tension when the front end of the hitch frame is connected to the tractor drawbar and the rear end of the implement frame is above the ground surface supported on the rear wheels.

5. The apparatus of claim 4 wherein the tension link exerts a forward bias force on the lower hitch pivot axis when the front end of the hitch frame is connected to the tractor drawbar and the rear end of the implement frame is above a ground surface supported on the rear wheels.

6. The apparatus of claim 5 wherein a front section of the tension link is movably connected to a rear section of the tension link such that a distance between the front and rear ends of the tension link varies, and wherein the forward bias force is selected to maintain the distance between the front and rear ends of the tension link at a substantially constant operating distance, and to allow the distance between the front and rear ends of the tension link to increase when a downward force is exerted on the lower hitch pivot axis that exceeds a release force.

7. The apparatus of claim 6 wherein the front and rear sections of the tension link are telescopically connected.

8. The apparatus of claim 6 wherein the operating distance between the front and rear ends of the tension link is adjustable to vary the front to rear angle of the implement frame with respect to the ground surface.

9. The apparatus of claim 1 wherein the hitch assembly comprises a rocker arm pivotally attached to the hitch frame about an arm pivot axis oriented substantially parallel to the upper and lower hitch pivot axes, and wherein the front end of the tension link is connected to the rocker arm and the front hydraulic cylinder is operative to move the rocker arm forward and rearward.

10. The apparatus of claim 9 herein the hitch assembly comprises a float arm pivotally attached to the hitch frame about the arm pivot axis, and wherein the front hydraulic cylinder is connected to the float arm, and wherein the float arm is configured to bear against the rocker arm such that extending and retracting the front hydraulic cylinder moves the front end of the pivot arm.

11. The apparatus of claim 10 wherein a weight of the front end of the implement frame exerts a rearward force on the tension link and on the rocker arm such that the rocker arm exerts a rearward force on the float arm.

12. The apparatus of claim 9 wherein the rocker arm defines an arm pin hole that is aligned, when in the implement frame is in a raised position, with a corresponding frame pin hole defined in the hitch frame, such that when the arm and frame pin holes are aligned, a lock pin can inserted through the aligned arm and frame pin holes to prevents the tension link and lower hitch pivot axis LHA from moving with respect to the hitch frame.

13. The apparatus of claim 1 wherein the implement frame is a mower implement frame.

14. A method of maintaining a substantially consistent front to rear angle of an implement frame with respect to a ground surface, where the implement frame is mounted on a plurality of rear wheels pivotally mounted to a rear end of the implement frame to support the rear end of the implement frame for travel along the ground surface in an operating travel direction, and where a rear hydraulic cylinder is activated to selectively move the rear wheels upward and downward with respect to the implement frame, the method comprising:

pivotally connecting a rear end of a hitch frame to a front end of the implement frame about an upper hitch pivot axis oriented substantially horizontally and perpendicular to the operating travel direction;

configuring a front end of the hitch frame for releasable connection to a tractor drawbar;

pivotally connecting a rear end of a tension link to the front end of the implement frame about a lower hitch pivot axis located below the upper hitch pivot axis and oriented substantially parallel to the upper pivot axis, and movably mounting a front end of the tension link to a front portion of the hitch frame;

connecting a front hydraulic cylinder to the hitch frame such that the front hydraulic cylinder is operative to move the front end of the tension link forward and rearward;

providing a hydraulic control operative to control a flow of hydraulic fluid to the front and rear hydraulic cylinders;

operating the hydraulic control to activate the front hydraulic cylinder to move the front end of the tension link rearward as the rear hydraulic cylinder moves the rear wheels upward with respect to the implement frame, and operating the hydraulic control to activate the front hydraulic cylinder to move the front end of the tension link forward as the rear hydraulic cylinder moves the rear wheels downward with respect to the implement frame such that the front to rear angle of the implement frame with respect to the ground surface is substantially constant as the rear wheels move up and down with respect to the implement frame.

15. The method of claim 14 comprising exerting a forward bias force on the lower hitch pivot axis with the tension link.

16. The method of claim 15 wherein a front section of the tension link is movably connected to a rear section of the tension link such that a distance between the front and rear ends of the tension link varies, and wherein the forward bias force is selected to maintain the distance between the front and rear ends of the tension link at a substantially constant operating distance, and to allow the distance between the front and rear ends of the tension link to increase when a downward force is exerted on the lower hitch pivot axis that exceeds a release force.

17. The method of claim 16 comprising connecting the front and rear sections of the tension link telescopically.

* * * * *